(12) United States Patent
Schnelle

(10) Patent No.: US 6,558,283 B1
(45) Date of Patent: May 6, 2003

(54) HYBRID TRANSMISSION, ESPECIALLY FOR MOTOR VEHICLES

(75) Inventor: Klaus-Peter Schnelle, Ditzingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/830,941

(22) PCT Filed: Sep. 22, 1999

(86) PCT No.: PCT/DE99/03026

§ 371 (c)(1),
(2), (4) Date: May 2, 2001

(87) PCT Pub. No.: WO00/26053

PCT Pub. Date: May 11, 2000

(30) Foreign Application Priority Data

Nov. 3, 1998 (DE) .......................... 198 50 550
Feb. 1, 1999 (DE) .......................... 199 03 936

(51) Int. Cl.[7] .............................. F16H 3/72; F16H 37/06
(52) U.S. Cl. ................... 475/5; 475/4; 475/8; 180/65.2
(58) Field of Search .................. 475/5, 3, 149, 475/4, 2, 8; 180/65.2, 65.6, 65.7

(56) References Cited

U.S. PATENT DOCUMENTS

| | | | | |
|---|---|---|---|---|
| 3,923,115 A | * | 12/1975 | Helling ........................ | 180/165 |
| 4,260,919 A | * | 4/1981 | Fleming ...................... | 310/113 |
| 5,558,589 A | * | 9/1996 | Schmidt ........................ | 475/5 |
| 5,571,058 A | | 11/1996 | Schmidt ........................ | 475/5 |
| 5,730,676 A | * | 3/1998 | Schmidt ...................... | 475/149 |
| 5,904,631 A | * | 5/1999 | Morisawa et al. ............. | 475/5 |
| 6,278,195 B1 | * | 8/2001 | Yamaguchi et al. ...... | 290/40 A |

FOREIGN PATENT DOCUMENTS

| | | |
|---|---|---|
| DE | 41 22 628 A | 1/1993 |
| DE | 197 30 858 A | 1/1998 |
| EP | 0 703 659 A | 3/1996 |
| EP | 0 755 818 A | 1/1997 |
| JP | 50 030223 A | 3/1975 |

OTHER PUBLICATIONS

Article A Development of Toyota Hybrid System, Tecnical Review vol. 47, No. 2, Apr. 2, 1998.
"Mechanisch–Elektrische Fahrzeuggetriebe IM Vergleich" By P. Tenberge et al, VDI–Bericht NR. 1393, VDI–Verlag Duesseldorf 1998, S. 551–577.

* cited by examiner

Primary Examiner—Sherry Estremsky
Assistant Examiner—Tisha D. Lewis
(74) Attorney, Agent, or Firm—Michael J. Striker

(57) ABSTRACT

A transmission (15; 15a; 15b; 15c), in particular for motor vehicles, has two planetary gears (16; 16c, 17; 17c), whose ring gears (18; 18c, 19) are connected by a crown gear (12) to the crankshaft (11; 11a; 11c) of an internal combustion engine. Each planetary gear (16; 16c, 17) is coupled to a respective gear shaft (31, 32), on which input gear wheels (1E–5E, RE) for various gear ratios are disposed. The input gear wheels (1E–5E, RE) mesh with output gear wheels (1A–5A, RA) disposed on an output shaft (40; 40a; 40c). It is provided that each planetary gear (16; 16c, 17) be coupled with an electric machine (26, 27), and the electric machines are for instance connected to the sun wheels (23; 23a, 24; 24a) of the planetary gear (16; 16c, 17). With the arrangement described, especially for use in hybrid vehicles, relatively high total efficiency and infinitely variable gear ratios can be achieved.

10 Claims, 4 Drawing Sheets

HYBRID TRANSMISSION, ESPECIALLY FOR MOTOR VEHICLES

PRIOR ART

Figure 1:
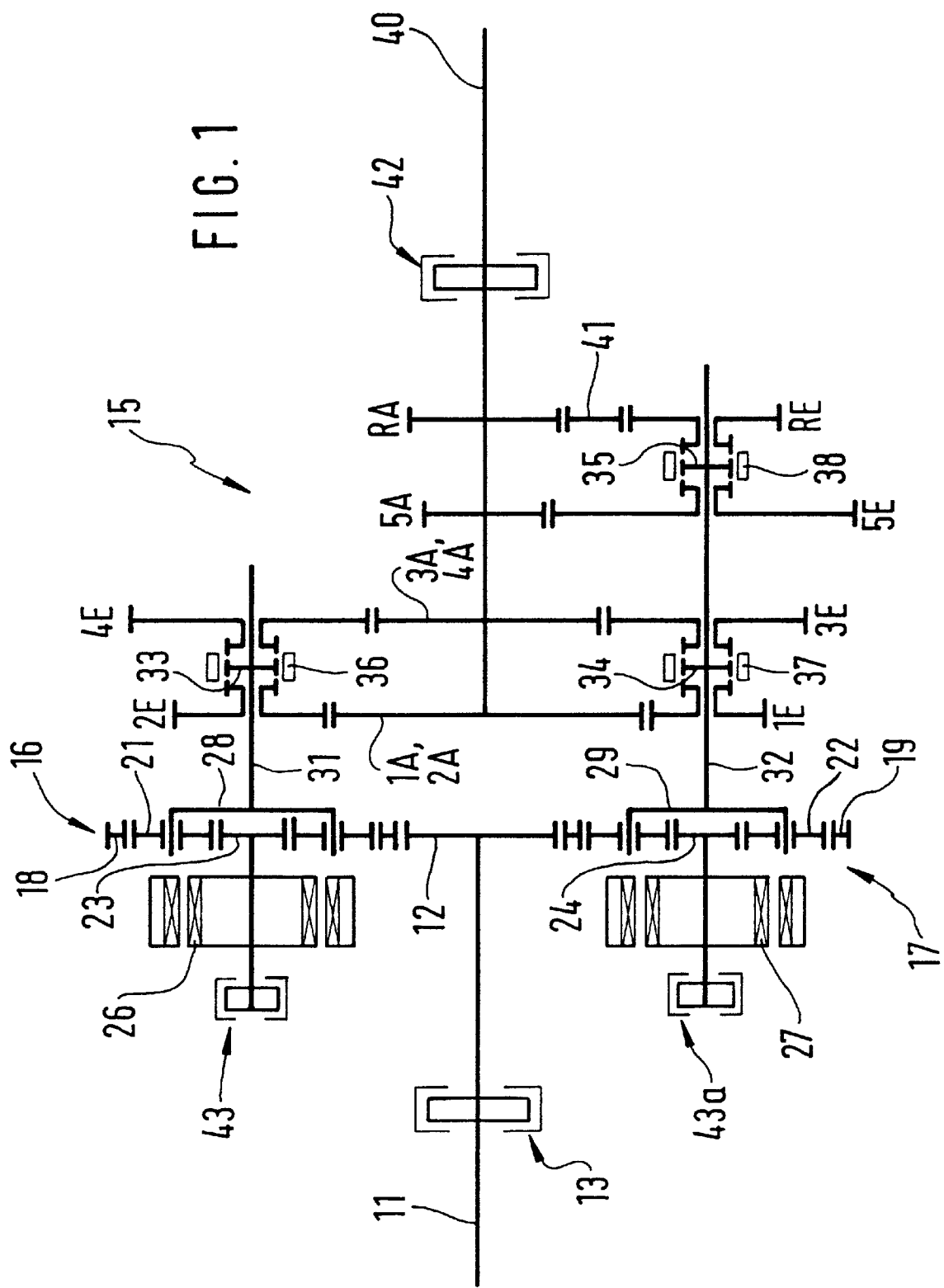

The invention relates to a transmission, in particular for motor vehicles, as generically defined by the preamble to claim 1. One such transmission is described in the article entitled "A development of Toyota Hybrid System" (Technical Review, Vol. 47, No. 2, Apr. 2, 1998). In the known transmission for a hybrid vehicle, a single planetary gear is provided. Its ring gear connected to the output shaft is coupled to a first electric machine, while the sun wheel is connected to a second electric machine. Via the planet carrier connected to the drive shaft or crankshaft of the internal combustion engine, a driving moment is introduced into the planetary gear. By varying the rotary speed of the sun wheel coupled to the second electric machine, an arbitrary rotary speed can be established for a given planet wheel rotation, generated by the engine, at the ring gear, and as a result arbitrary gear ratios between the ring gear and thus the output shaft and the engine can be attained. The torques are always divided by a fixed ratio, by means of the planetary gear, among the engine, the output shaft, and the second electric machine. For a given torque of the engine and a certain gear ratio, the rotary speed and the requisite torque at the second electric machine are thus fixed. If the requisite rotary speed at the second electric machine changes, then its electrical power varies as well. In the generator mode of the second electric machine, the power thus generated can be output to the first electric machine again, while in the motor mode of the second electric machine the process is correspondingly reversed. This process is known as electrical power branching. A disadvantage of such power branching, however, is the incident losses.

For this reason, the so-called SEL transmission has been proposed (P. Tenberge, W. Hofmann: Mechanisch-elektrische Fahrzeuggetriebe im Vergleich [A Comparison of Mechanical-Electrical Vehicle Transmissions], VDI-Bericht Nr. 1393, VDI-Verlag Düsseldorf 1998, pages 551 ff.). Here, downstream of the planetary set of a planetary gear there is an additional three-stage gear that reduces the spreading of the rotary speed of the electric machine. A disadvantage is the relatively complicated gear mechanics and the requisite hydraulics for shifting the lamination clutches and brakes.

ADVANTAGES OF THE INVENTION

The transmission of the invention, especially for motor vehicles, having the characteristics of the body of claim 1 has the advantage over the prior art that it is relatively simply constructed in mechanical terms and has good efficiency. This is attained according to the characteristics of the body of claim 1 in that because of the two planetary trains each coupled to one electric machine, it is possible to reduce the electrical power flow of the two electric machines such that in the generator mode, for instance, only the power required by the on-board electrical system is generated by the two electric machines.

Further advantages and advantageous refinements of the transmission according to the invention, in particular for motor vehicles, will become apparent from the dependent claims and the description.

By coupling the two electric machines each to one gear shaft and by using planetary trains, conventional clutches can be dispensed with. The two electric machines furthermore replace a starter otherwise needed for the starting the engine and a generator and synchronizing devices for shifting individual gears. Moreover, by the use of two gear shafts, shifting the gears can be attained without interrupting the tractive force. By means of the two electric machines, it is furthermore possible to achieve an infinitely graduated step-up in the range between two gear stages.

DRAWING

Figure 2:
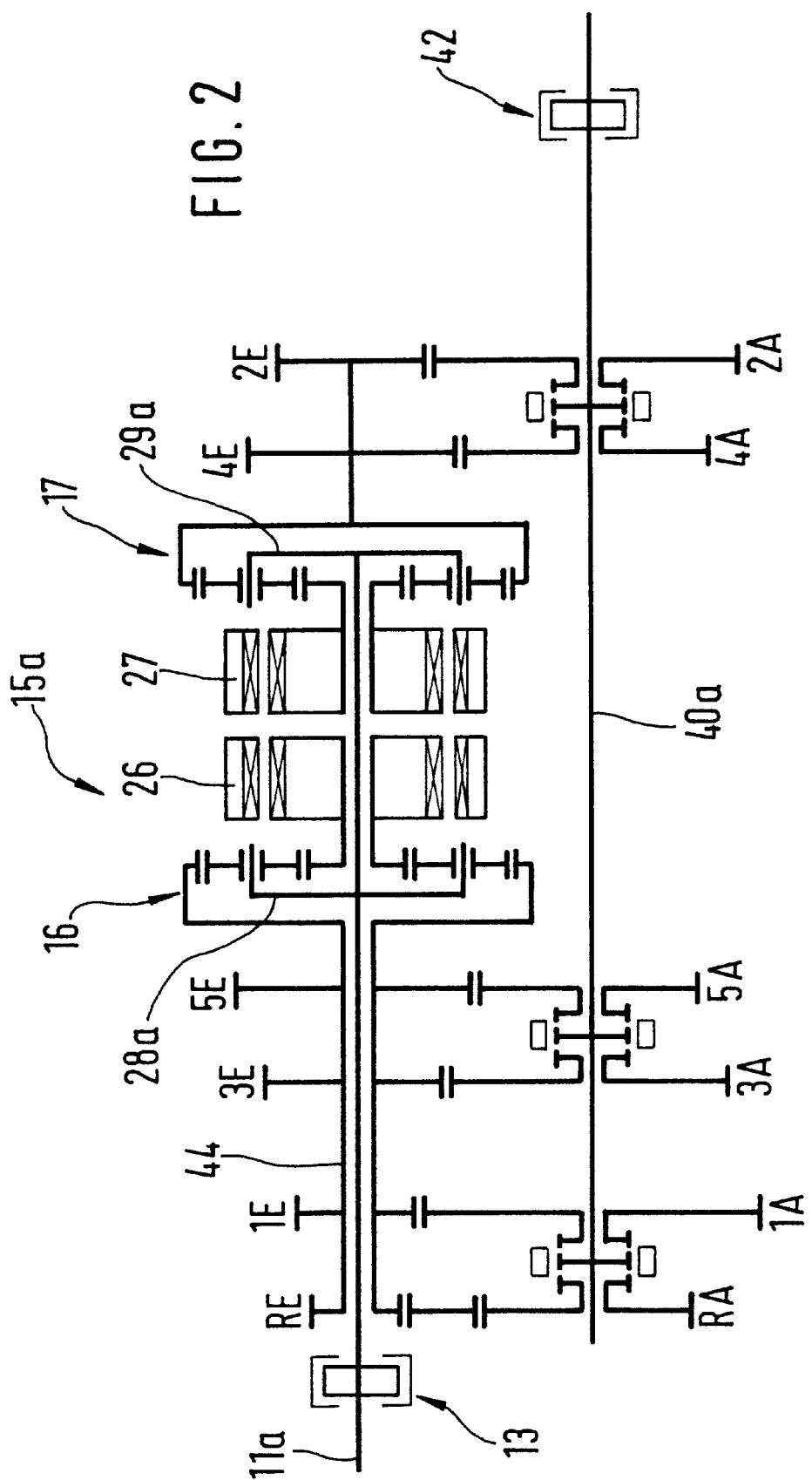
Figure 3:
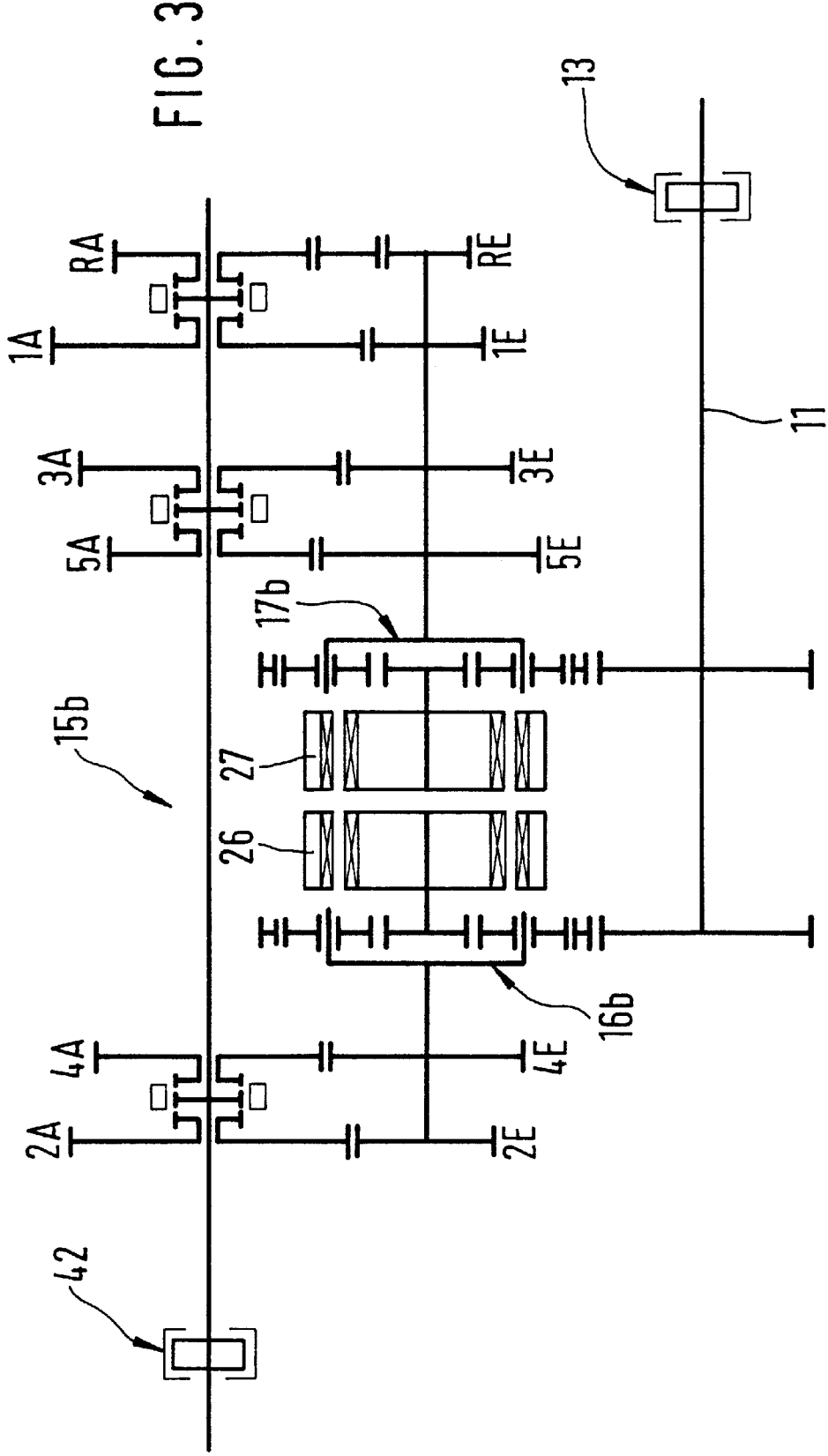
Figure 4:
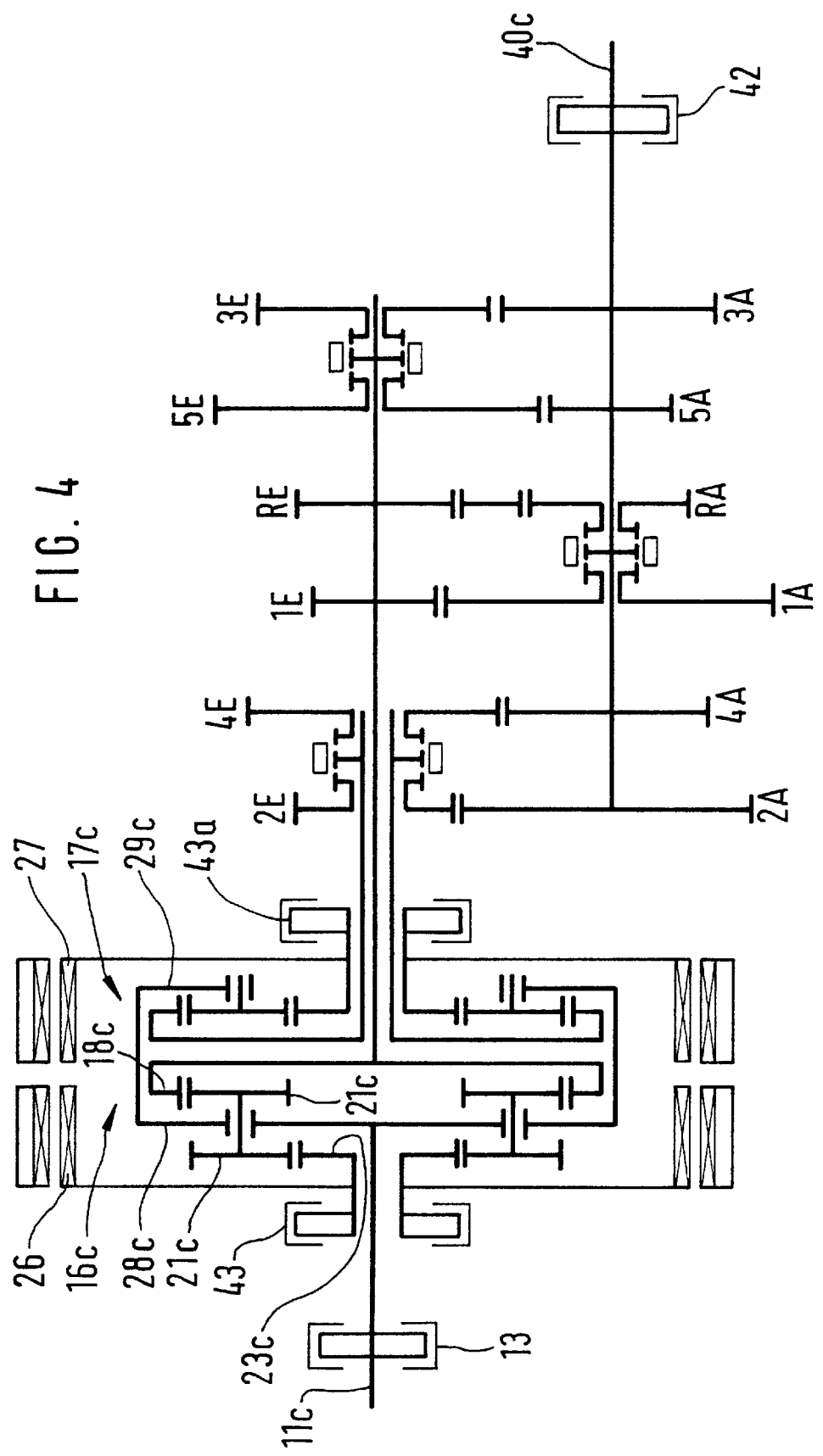

Exemplary embodiments of the invention are shown in the drawing and will be described in further detail below. Shown are:

FIG. 1, a first transmission according to the invention, shown schematically; and FIGS. 2–4, transmissions modified compared to FIG. 1, again schematically.

DESCRIPTION OF THE EXEMPLARY EMBODIMENTS

In FIG. 1, part of the drive train of a motor vehicle is shown. Among other parts, the drive train includes the crankshaft 11 of an internal combustion engine, not otherwise shown, at the end of which a crown gear 12 is provided. The crankshaft 11 also cooperates with an engine brake 13. A transmission 15, which in the exemplary embodiment is embodied as a three-shaft transmission, can be coupled to the crown gear 12.

The transmission 15 has two preferably identical planetary trains, in particular two planetary gear sets 16, 17. Each planetary gear set 16, 17, in a manner known per se, has a respective ring gear 18, 19 with teeth on the inside and outside, a plurality of planet wheels 21, 22, and one sun wheel 23, 24. The coupling of the transmission 15 to the crown gear 12 is effected via the sets of external teeth of the ring gears 18, 19 of the planetary gear sets 16, 17. On the side of the planetary gear sets 16, 17 toward the crankshaft 11, each sun wheel 23, 24 is coupled to one electric machine 26, 27. The electric machines 26, 27 connected to one another, for example via an electrical adaptor circuit, and to the on-board battery of the vehicle are equipped with an electronic power unit for four-quadrant operation. The planet carriers 28, 29 of the planetary gear sets 16, 17 are connected, on the side opposite the electric machines 26, 27, to gear shafts 31, 32.

The two gear shafts 31, 32 carry the input gear wheels 1E–5E and RE of a five-speed manual transmission. To connect the input gear wheels 1E–5E and RE, disposed loosely on the gear shafts 31, 32, to the gear shafts 31, 32, there is also one gear wheel 33, 34, 35 each disposed in a manner fixed against relative rotation between the input gear wheels 2E and 4E, the input gear wheels 1E and 3E, and the input gear wheels 5E and RE, respectively. The gear wheels 33, 34, 35 can be made to engage the respective input gear wheel 1E–5E and RE and thus connected nonpositively by means of electrically actuatable slide cuffs 36, 37, 38 and claw couplings.

The input gear wheels 1E–5E and RE mesh with output gear wheels 1A–5A and RA, which are disposed in a manner fixed against relative rotation on an output shaft 40, and an intermediate gear wheel 41 is also disposed between the input gear wheel RE and the output gear wheel RA. To make it possible to block or lock the output shaft 40, the output shaft cooperates with a brake 42 as well. The brake 42 can also be the service brake of the motor vehicle.

Various modes of operation that can be achieved with the transmission 15 described above will be described below;

the open- and closed-loop control of both the transmission 15 and the engine are done by means of electronic control units: For starting the engine of the motor vehicle when the vehicle is at a stop, the brake 42 is activated; that is, the output shaft 40 is blocked. Furthermore, at each of the two gear shafts 31, 32 one gear or speed, such as first gear and second gear, is selected, to which end the slide cuffs 37, 38 are in coincidence with the corresponding input gear wheels 1E and 2E. By selecting one gear on each gear shaft 31, 32, the planet carriers 28, 29 of the planetary gear sets 16, 17 are fixed, or in other words cannot rotate, when a starting moment is introduced via the sun wheels 23, 24. Now the two electric machines 26, 27 are motor-driven by the on-board battery. Via the rotating planet wheels 21, 22, the torque introduced into the sun wheels 23, 24 by the electric machines 26, 27 generates a rotation of the applicable ring gear 18, 19, which in turn drive the crown wheel 12 of the crankshaft 11 at the requisite starting rotary speed, by which means the engine is started.

A conventional or appropriate design of the planetary gear sets 16, 17 leads to a starting ratio of approximately 4:1. On the assumption that a requisite starting torque of an internal combustion engine is on the order of magnitude of about 200 Nm, each electric machine 26, 27 acting as an electric motor must accordingly furnish approximately 25 Nm. This requisite torque at the same time determines the structural size and power stage of the electric machines 26, 27.

It will also be noted at this point that the two electric machines 26, 27, in the starting mode, or in other words with the planet carriers 28, 29 fixed, are driven in turn, after the engine has been started, by the engine via the crown gear 12. Because of the aforementioned gear ratios of the planetary gear sets 16, 17, the electric machines 26, 27 are then driven at approximately four times the engine rpm of the internal combustion engine. In order not to exceed the limit rotary speeds of the electric machines 26, 27, the engine rpm of the internal combustion engine for this instance should be limited during the starting mode.

The normal operation of the motor vehicle in which the vehicle is traveling at a uniform or variable speed will now be described. In this case, one speed or gear, such as second gear and third gear, is selected in each of the two gear shafts 31, 32 in the transmission 15. The corresponding gear wheels 2E and 3E are thus connected nonpositively to the gear wheels 2A and 3A of the output shaft 40. A defined ratio exists between the rotary speeds of the two planet carriers 28 and 29, in accordance with the gear ratios between second gear and third gear, and the planet carrier 28 for second gear rotates at a higher rpm than the planet carrier 29 for third gear. The rpm or rotary speed of the output shaft 40 is also proportional to the travel speed of the motor vehicle. Since, given identical planetary gear sets 16, 17, the ring gears 18, 19 driven by the engine rotate at the same rpm, defined rotary speeds of the sun wheels 23, 24 coupled to the electric machines 26, 27 thus result. If the rpm level of the two electric machines 26, 27 is then changed, then at a constant engine rpm, the ratio between the rpm of the internal combustion engine and the rpm of the output shaft 40 changes as well. In other words, a variation in the rpm level of the electric machines 26, 27 leads to a variation (which is infinitely graduated) of the transmission ratio, given fixedly selected speeds or gears at the gear shafts 31, 32.

At a torque specified by the engine and at a requisite drive moment at the output shaft 40, a fixedly predetermined total torque results at the two electric machines 26, 27. In addition, the torque of the engine and the total torque at the two electric machines 26, 27 are always at a fixed ratio, as long as no brake is actuated. The current torque of the engine can thus be derived quite precisely from the total torque of the two electric machines 26, 27, which is known from their control. Knowledge of the current torque of the engine is helpful, for the sake of coordinated control of the drive train and the engine, and this knowledge can simplify or improve such control.

Because of the branching of the torque via the two gear shafts 31, 32, the total torque of the two electric machines 26, 27 can be divided arbitrarily between the gear shafts. Since because different gears are selected at the two gear shafts 31, 32 the two electric machines 26, 27 have different rotary speeds, their electrical power thus varies as well.

In normal operation, it is especially advantageous to have the two electric machines 26, 27 function as generators, which generate only the energy or power required by the on-board electrical system. As a consequence, for a determined requisite electrical power of the two electric machines 26, 27, a certain rpm level at the two electric machines 26, 27 and thus a certain gear ratio of the transmission 15 are thus established. The infinitely graduated variation of the gear ratio that is possible, within certain limits, with the electric machines 26, 27 is achieved solely by the fact that the electrical power required by the on-board electrical system is divided between the two electric machines 26, 27 functioning as generators, and no power branching, which causes losses, occurs between the two electric machines 26, 27.

It is sufficient if the spread of the gear ratio that is possible by means of the two electric machines 26, 27 covers a relatively small range, since greater changes in the gear ratio can be achieved by changing gears. If the possible spread for one gear, such as at low power levels of the on-board electrical system, is insufficient, it can be raised either by allowing a power flow (which entails losses) between the two electric machines 26, 27, or by increasing the electrical power for charging the on-board battery to beyond the actual demand of the on-board electrical system.

A shifting operation in the transmission 15, which is necessary to change the gear ratio, for instance if the engine, at a certain rpm and at a correspondingly higher load is meant to enable a higher travel speed, will now be explained. As an example, it is assumed that a shift is to be made from third gear to fifth gear at the second gear shaft 32, while fourth gear remains selected in the first gear shaft 31. Before the actual shifting event itself, to that end the electric machine 27 associated with the second gear shaft 32 is shifted to be load-free, and as a result the moment in the second gear shaft 32 becomes zero, with the exception of a slight moment originating from the mass inertia of the components. The power flow in this situation takes place solely via the first gear shaft 31, and its associated electric machine 26 supports some of the drive moment and can function as a motor or as a generator. As soon as the second gear shaft 32 is load-free, the selected third gear can be disengaged by disconnection of the claw coupling and displacement of the sliding cuff 37. Next, the electric machine 27 of the second gear shaft 32 generates the requisite synchronizing rpm, at which the second gear shaft 32 is rotated at a rotary speed that corresponds to the rpm of the gear wheel 5E for fifth gear, which gear wheel is driven via the output shaft 40. Once this has been done, the power flow between the second gear shaft 32 and the gear wheel 5E is established by displacement of the sliding cuff 38. The controller of the transmission 15 can ascertain the rpm required for synchronizing the second gear shaft 32 from the rotary speeds of the electric machine 26 and of the engine.

No additional sensors are needed for detecting the rpm at the gear shafts 31, 32.

The other shift changes in upshifting and downshifting take place accordingly; it is a characteristic of all shift changes that a power flow always exists between the crankshaft 11 of the internal combustion engine and the output shaft 40 via one of the two gear shafts 31, 32, so that the shifting events can take place without interrupting the tractive force.

Especially advantageously, so-called hybrid vehicles, which have both an electric motor and an internal combustion engine, can be operated with the transmission 15. Vehicle operation by electric motor, which for the sake of clean air, for instance, is used in downtown areas, is achieved by means of the two electric machines 26, 27, which are supplied with the requisite energy from the on-board battery. To reinforce the torque, introduced by the electric machines 26, 27 into the gear shafts 31, 32 via the planet carriers 28, 29, the ring gears 18, 19 of the planetary gear sets 16, 17 must be fixed. This is done in a simple way by actuating the engine brake 13, which acts on the ring gears 18, 19 via the crown gear 12.

If during purely electric-powered travel the internal combustion engine is then to be re-started, then for that purpose second gear and reverse are selected in the transmission 15. The electric machine 27 rotates in reverse, in other words with the requisite direction of rotation for starting the engine, while the electric machine 26 is driven forward. Thus both electric machines 26, 27 introduce an identically acting driving torque into the output shaft 40. Because of the different gear ratios between second gear and reverse that have been selected, a higher torque (reinforced via the engine brake 13) is transmitted to the crown gear 12 via the ring gear 19 of the second electric machine 27, which is associated with reverse gear, than via the ring gear 20. For the actual starting, it therefore suffices to release the engine brake 13, whereupon the crown gear 12 and the crankshaft 11 are rotated in the requisite starting direction of the engine via the ring gear 19 of the second electric machine 27. Once the engine is started, then in accordance with the above-described gear change, reverse is shifted out of at the second gear shaft 32, and instead first gear or third gear is selected.

In addition, it will be noted that during starting of the engine, because of the torque introduced into the drive train by the engine, bucking that is unpleasant to the driver can occur; this can be compensated for by a suitable closed-loop control strategy by means of the two electric machines 26, 27.

The aforementioned travel of the motor vehicle achieved solely by means of the electric machines 26, 27 necessarily means a relatively high withdrawal of energy from the on-board battery. To limit the required battery capacity or to enable recharging during engine-driven operation, the operation of the two electric machines 26, 27 as a generator has already been mentioned. It is especially advantageous to use the rolling energy, stored during overrunning in the motor vehicle, to drive the electric machines 26, 27 as generators. To that end, the engine is shifted to the (load-free) overrunning mode and the engine brake 13 is activated. Thus the two sun wheels 23, 24 coupled to the electric machines 26, 27 are driven via the rotating planet carriers 28, 29.

The transmission described above can be modified in manifold ways. For instance, it may be necessary to provide an additional brake 43, 43a at at least one of the two electric machines 26, 27. This can make it possible to start the motor vehicle from a stop at high power. This can be explained by the fact that when a vehicle is stopped the two electric machines 26, 27 rotate, at a gear ratio of the planetary gear sets 16, 17 of approximately 4:1 as already mentioned, at approximately four times the engine rpm. If upon startup a relatively high starting moment is introduced into the crankshaft 11 via the engine, then this moment must be reinforced by the electric machines 26, 27, which necessarily leads briefly to very high electrical power levels at the electric machines 26, 27. By using at least one additional brake 43, 43a cooperating with at least one electric machine 26, 27, this starting moment can be received by the brake 43, 43a and converted into frictional work. The brake 43, 43a can be embodied as a mechanically acting friction brake (jaw brake or lamination brake). However, it is especially advantageous to embody the brake 43, 43a as an eddy current brake. This eddy current brake can additionally act as a constituent of an accessory heater system (for example for a water-cooled generator) and can briefly reinforce very high moments.

In the exemplary embodiment, the transmission 15 is shown and described as a planetary gear. Instead of planetary gears, however, other types of planetary trains can also be used. If planetary gears are used, a different coupling of the various elements to the components of the planetary gear is also conceivable. For instance, the engine can introduce its torque into the planet carrier as well, while the gear shafts are coupled to the ring gears.

Three further variants are shown in FIGS. 2, 3 and 4: In FIG. 2, a transmission 15a is shown, which is embodied as a hollow shaft transmission, instead of as a three-shaft transmission as in FIG. 1. The crankshaft 11a coupled to the planet carriers 28a, 29a is enclosed by a hollow gear shaft 44 on which the input gear wheels RE, 1E, 3E and 5E are disposed, while a gear shaft 45 carries the input gear wheels 4E and 2E in an extension of the crankshaft 11a. The input gear wheels 1E–5E and RE cooperate with output gear wheels 1A–5A and RA, which are disposed on an output shaft 40a extending parallel to the hollow gear shaft 44, the crankshaft 11a and the gear shaft 45. The advantage of the transmission 15a shown in FIG. 2 is considered in particular to be its slenderer construction.

The transmission 15b shown in FIG. 3 differs from the transmission 15 of FIG. 1 in particular in that the two electric machines 26, 27 are disposed side by side and the two planetary gear sets 16b, 17b are (as in the transmission 15a) disposed in mirror symmetry to one another. Once again, by the in-line arrangement, as in the transmission 15a, of the two electric machines 26, 27 and the planetary gear sets 16b, 17b, a relatively compact transmission can be achieved.

An especially advantageous variant is the transmission 15c shown in FIG. 4. It differs from the transmission 15a in particular in that the planet wheels 21c of the planetary gear 16c are double and are joined by a rigid shaft. The first planet wheel 21c on the left-hand side of the planet carrier 28c meshes with the sun wheel 23 connected to the electric machine 26, while on the right-hand side of the planet carrier 28c, the second planet wheel 21c meshes with the ring gear 18c of the drive. The result is a very compact transmission, which in its construction is similar to modern manual transmissions; the electric machines occupy the space that is needed in conventional manual transmissions for the clutch.

Naturally it is also conceivable to equip the transmissions 15a, 15b or 15c with at least one additional brake 43, 43a as in the transmission 15 of FIG. 1.

What is claimed is:

1. A transmission for motor vehicles, comprising two planetary trains; an input shaft introducing a torque of an internal combustion engine and coupled to one of said planetary trains; an output shaft coupled to said one planetary train; two electrical machines disposed in operative connection with said one planetary trains, said electrical machines being coupled neither to said input shaft nor to said output shaft and being variable independently of one another, each of said two electrical machines being each coupled to a respective one of said two planetary trains, each of said planetary trains being coupled to a separate gear shaft disposed in operative connection with said output shaft.

2. A transmission as defined in claim 1; and further comprising input gear wheels which mesh with output gear wheels disposed on said output shaft, said input gear wheels being disposed on each gear shaft.

3. A transmission as defined in claim 1, wherein said planetary trains are planetary gears having ring gears coupled to said input shaft, sun wheels coupled to said electrical machines, and planet carriers coupled to said gear shafts.

4. A transmission as defined in claim 1, wherein said planetary trains are planetary gears with planet carriers coupled to said input shaft, sun wheels coupled to said electrical machines, and ring gears coupled to said gear shafts.

5. A transmission as defined in claim 1, wherein said electrical machines are located in axial alignment with one another.

6. A transmission as defined in claim 1, wherein said electrical machines have rotary speeds which are variable in order to obtain an infinitely graduated gear ratio.

7. A transmission as defined in claim 1, wherein said input shaft and said output shaft each have one braking device.

8. A transmission as defined in claim 1, wherein at least one of said electrical machines is in operative connection with a braking device.

9. A transmission as defined in claim 2, and further comprising elements for non positive connection of said input gear wheels and said output gear wheels to said gear shafts and said output shaft, so that with the exception of intervals between shifting, a non positive connection always exists between both said gear shafts and said output shaft.

10. A transmission as defined in claim 2, wherein one of said gear shafts is formed as a hollow shaft which encloses said input shaft.

* * * * *